United States Patent [19]

Deubel et al.

[11] Patent Number: 4,729,796

[45] Date of Patent: Mar. 8, 1988

[54] PROCESS FOR PREPARING PIGMENT GRANULES FROM AQUEOUS SUSPENSION OF PIGMENT AND ALKALINE SOLUTION OF RESIN

[75] Inventors: Reinhold Deubel, Bad Soden am Taunus; Christa Uhde née Schilling, Kriftel; Werner Marx, Bad Soden am Taunus, all of Fed. Rep. of Germany

[73] Assignee: Hoechst Aktiengesellschaft, Frankfurt am Main, Fed. Rep. of Germany

[21] Appl. No.: 311,253

[22] Filed: Oct. 14, 1981

[30] Foreign Application Priority Data

Oct. 21, 1980 [DE] Fed. Rep. of Germany ....... 3039642

[51] Int. Cl.$^4$ ............. C09B 67/08; C09B 67/20; C09B 67/22; C09B 67/54
[52] U.S. Cl. ................ 106/309; 106/288 Q; 106/308 Q; 106/23
[58] Field of Search ............. 106/288 Q, 308 Q, 309; 260/208

[56] References Cited

U.S. PATENT DOCUMENTS

| | | | |
|---|---|---|---|
| 2,744,027 | 5/1956 | Struve et al. | 106/309 |
| 2,765,285 | 10/1956 | Weller | 106/309 |
| 2,822,283 | 2/1958 | Blaser et al. | 106/262 |
| 3,296,001 | 1/1967 | Ambler et al. | 106/309 X |
| 3,437,503 | 4/1969 | Massam et al. | 106/309 |
| 3,458,804 | 7/1969 | Wolf et al. | 106/308 |
| 3,586,247 | 6/1971 | Perrins | 106/309 |
| 3,635,745 | 1/1972 | Reutel et al. | 106/309 X |
| 3,980,488 | 9/1976 | Barrington et al. | 106/309 X |
| 4,134,725 | 1/1979 | Büchel et al. | |
| 4,166,811 | 9/1979 | Marr et al. | |
| 4,175,979 | 11/1979 | Robertson et al. | |
| 4,260,424 | 4/1981 | Mizoguchi et al. | 106/309 |
| 4,300,954 | 11/1981 | De Monterey et al. | 106/309 |
| 4,302,254 | 11/1981 | Landler | 106/309 X |

FOREIGN PATENT DOCUMENTS

| | | | |
|---|---|---|---|
| 240852 | 7/1927 | United Kingdom | 106/309 |
| 771678 | 4/1957 | United Kingdom | 106/309 |
| 801522 | 9/1958 | United Kingdom | 106/309 |
| 893821 | 4/1962 | United Kingdom | 106/309 |
| 1463141 | 2/1977 | United Kingdom | 106/309 |

OTHER PUBLICATIONS

K. Venkataraman, The Chemistry of Synthetic Dyes, vol. V, 1971, pp. 335 and 340.

Primary Examiner—Floyd D. Higel

[57] ABSTRACT

Easily dispersible dust-free pigment granules of high tinctorial strength are obtained by adding to the aqueous suspension of a finely divided pigment, an alkaline solution of from 25 to 90 weight percent based on the weight of the granules obtained, of colophony or a colophony derivative, acidifying the mixture, subjecting it to a flush process while stirring and heating to a temperature, above the softening point of the resin, up to 100° C. and isolatng the granules obtained. The granules are particularly suitable for preparing printing inks which are distinguished by a very high tinctorial strength, a good transparency and a low viscosity.

7 Claims, No Drawings

PROCESS FOR PREPARING PIGMENT GRANULES FROM AQUEOUS SUSPENSION OF PIGMENT AND ALKALINE SOLUTION OF RESIN

The present invention relates to a process for preparing easily dispersible, dust-free pigment granules of high tinctorial strength, which comprises adding to the aqueous suspension of a finely divided pigment an alkaline solution of a natural or synthetic resin or of a resin mixture, acidifying the resulting mixture, subjecting it to a flush process while stirring and heating to a temperature above the softening point of the resin and isolating the granules obtained. The granular size may be regulated by varying the resin quantity, the degree of dilution, the stirrer speed and by adjusting the pH and the temperature. The resin quantity required to obtain a stable granular material depends on the grain size of the starting pigment and is advantageously in the range of from 25 to 90 weight %, preferably of from 35 to 70 weight %.

The process according to the invention is carried out in a particularly advantageous manner using directly the pigment suspensions obtained in the pigment preparation, for example during coupled and laking, in the case of azo pigments. When proceeding in this manner, the high transparency and high tinctorial strength of the pigments become evident and are maintained upon drying the granules. The process according to the invention may be carried out alternatively using finely divided pigments and press cakes of pigments that have been suspended in water.

The fine granules, even in the case of very high resin contents, for example of from 50 to 60 weight %, may be processed to give printing inks having a tinctorial strength comparable to that of pigments of 100% concentration that have been prepared in usual manner.

Suitable resins include natural and synthetic resins, that are soluble in an aqueous alkaline medium, but substantially insoluble in the acidic pH range. Colophony, disproportionated colophony or hydrogenated colophony as well as colophony derivatives are particularly suitable for the process according to the present invention because of their high compatibility with the binding agents usually employed in printing inks and because of their low softening point. The resin content and the conduct of the temperature employed are adjusted in dependence on the type of resin employed.

The addition of antioxidants, for example those as described in "Ullmanns Enzyklopädie der technischen Chemie", 4th edition, volume 8, pages 25-42 may be recommended in order to avoid thermal oxidation processes of the resins contained in the finely granular pigments, an addition to from 0.1 to 2 weight % of a sterically hindered type of phenol, in particular pentaerythrityl-tetrakis-[3-(3,5-ditert.butyl-4-hydroxyphenyl)-propionate] being particularly advantageous.

The process according to the invention may be carried out using the usual pigments. It is particularly important, however, for pigments that are used predominantly in the field of printing inks, for example azo pigments, laked azo pigments and phthalocyanine pigments.

The finely granular pigments prepared according to the present invention are dust-free and may be well dosed. They are readily dispersible in the application media and yield a very high tinctorial strength, a good transparency and a low viscosity, for example in printing inks. The present invention therefore also relates to the use of these granules in printing inks.

As compared to the hitherto known methods for preparing such granules the process according to the invention may be carried out in extremely simple manner using the suspension obtained in the synthesis of the pigments, without the addition of solvents, organic acids or other auxiliaries, which would have to be removed or regenerated subsequently. However, this does not exclude that minor quantities of organic solvent max be present in the process according to the invention, for example, if pigment suspensions have been used that have a certain content of such solvents, or if the alkaline solution of a resin contains, for example, water-miscible solvents such as low molecular alcohols or ketones that may act as a solubilizer.

The flush process is carried out preferably at a temperature of up to 100° C., that means, operation may be carried out in an open vessel. The mixture is advantageously heated by injecting steam.

The following examples serve to illustrate the invention. Parts and percentages are by weight, unless otherwise stated. Weight parts and volume parts are related to one another as a kilogram to a liter.

EXAMPLE 1

A pigment suspension containing 47 parts of C. I. Pigment Yellow 12 (Colour Index 21090) in a final coupling volume of 2,100 parts is prepared by coupling at 10° C. and at a pH of from 5.5 to 5.7. After neutralization with dilute sodium hydroxide solution there are added at 70° C. 52 parts of a disproportionated colophony (softening point 73° C., acid number 150), in the form of a 10% solution in sodium hydroxide solution, and as an antioxidant, 1 part of pentaerythrityl-tetrakis-[3-(3,5-ditert.butyl-4-hydroxyx-phenyl)-propionate].

After heating to 80° C. there is added rapidly with slight agitation a 31% hydrochloric acid, until a pH of 4 is reached. Thereby a granular material is formed in a flush process. This process is terminated by subsequent heating to 98° C. by injection of direct steam. The product is filtered off at 60° C., washed salt-free with water and dried at 60° C. in a circulating air cabinet.

There are obtained 99 parts of a free-flowing granular material having a particle diameter of from about 1 to 4 mm. It may be processed in very easy manner in a commercial book printing and offset printing varnish to give a printing ink, which is distinguished by a good transparency and a good gloss and which yields prints of only slightly lower tinctorial strength than a printing ink prepared with an equal weight quantity of the starting pigment, although the granular material has a resin content of 53%.

EXAMPLE 2

When proceding in the manner described in Example 1 but using instead of the disproportionated colophony a hydrogenated colophony having a softening point of 75° C. and an acid number of 165 there is likewise obtained a well-shaped granular material.

EXAMPLE 3

Coupling at 20° C. and at a pH of from 5.5 to 5.7 yields a pigment suspension containing 60 parts of C. I. Pigment Yellow 13 (Colour Index 21100) in a final coupling volume of 1,500 parts. After neutralization with dilute sodium hydroxide solution there are added at 70° C. 39 parts of disproportionated colophony as a solution in sodium hydroxide solution. The batch is heated to 98° C. by injection of direct steam and maintained at this temperature for 2 hours. After cooling of the reaction mixture to 80° C. there is added 1 part of the antioxidant as used in Example 1 and subsequently hydrochloric acid, whereupon the reaction mixture is treated in the manner described in Example 1 to give a granular material (100 parts).

Printing inks prepared from equal weight quantities of the granular material and of the starting pigment, respectively, showed to have about the same tinctorial strength in a coloristic comparative test, however, the transparency and the gloss of prints obtained from the printing ink prepared from the granular material were better.

EXAMPLE 4

By coupling at a pH of from 5.5 to 5.7 at 20° C. there is prepared a pigment suspension containing 60 parts of a mixed coupling product of the diazonium compound of 3,3'-dichloro-4,4'-diamino-biphenyl and of a mixture of 0.4 mol of 1-acetoacetylamino-2-methoxybenzene and 1.6 mol of 1-acetoacetylamino-2,4-dimethyl-benzene in a final coupling volume of 1,500 parts.

After neutralization with dilute sodium hydroxide solution there are added at 70° C. 38 parts of disproportionated colophony (softening point 73° C., acid number 150) in the form of a 10% solution in a sodium hydroxide solution. The mixture is successively heated to 98° C. by injection of direct steam, maintained for 2 hours at this temperature and cooled to 80° C. Upon addition of 2 parts of the antioxidant as used in Example 1 a 31% hydrochloric acid is added rapidly with slight agitation until a pH of 4 is reached, whereby a granular material is formed in a flush process. This process is terminated by subsequent heating to 98° C. by injection of direct steam. The product obtained is filtered off at 60° C., washed salt-free with water and dried in a circulating air cabinet at 60° C. There are obtained 99.5 parts of a free-flowing granular material having a particle diameter of from about 2 to 5 mm.

The tinctorial strengths of the granular material containing 60 parts of pigment and of the starting pigment of 100% concentration, used in equal amounts, are likewise comparable. Thus, the granulation method described hereinbefore results in a significant gain of tinctorial strength.

EXAMPLE 5

The example is carried out in the manner described in Example 4 using 44 parts of colophony (melting point 60°-65° C., acid number 165) for 55 parts of pigment. Hydrochloric acid is added at 98° C.

There are obtained 95 parts of a well-shaped granular material.

EXAMPLE 6

The example is carried out in the manner described in Example 4 using 49 parts of a condensation product of formaldehyde and colophony of a softening point of 69° C. and of an acid number of 145 for 50 parts of pigment. Hydrochloric acid is added at 90° C. There are obtained 97 parts of a well-shaped granular material.

EXAMPLE 7

By coupling at a decreasing pH range of from 5.8 to 3.5 at 60° C. there is prepared a pigment suspension containing 40 parts of a mixed coupling product of about 1 mol of the diazonium compound of 1-amino-2-methoxybenzene-5-carboxylic acid phenylamide coupled onto 80 mol-% of (2-hydroxy-3-napthoylamino)-2-methyl-5-chlorobenzene and 20 mol-% of (2-hydroxy-3-naphthoylamino)-2,5-dimethoxy-4-chlorobenzene, in a final coupling volume of 1,800 parts. After having adjusted the pH to 12 with concentrated sodium hydroxide solution there are added 59.8 parts of disproportionated colophony as an alkaline solution. Next, the mixture is heated to 98° C. by injection of direct steam, maintained for 2 hours at this temperature and subsequently cooled to 80° C. After addition of 0.2 part of the antioxidant as used in Example 1 and of hydrochloric acid, the mixture is processed in the manner described in Example 1 to give a granular material (99 parts).

EXAMPLE 8

By coupling and subsequent laking with calcium chloride solution at a pH of from 9 to 7.8 at a temperature of 25° C. there is prepared a pigment suspension containing 32 parts of C. I. Pigment Red 57:1 (Colour Index 15850:1) in in final laking volume of 3,000 parts. After heating for 30 minutes to 80° C. there are added 1 part of the antioxidant according to Example 1 and 67 parts of disproportionated colophony as an alkaline solution.

Next, a 31% hydrochloric acid is slowly added dropwise, with slight agitation, until a pH of 3 is reached. After heating to 98° C., the granular material obtained is worked up in the manner described in Example 1.

EXAMPLE 9

32 Parts of a pigment suspension of C. I. Pigment Red 57:1 that has been prepared under the conditions as specified in Example 8 are suction-filtered and washed salt-free. A 1.5% pigment suspension is made by stirring the moist filter cake in water, whereupon 1 part of the antioxidant as used in Example 1 is added. Next, there are added at 70° C. 67 parts of disproportionated colophony according to Example 1 and a 31% hydrochloric acid is slowly dropped into the mixture, with slight agitation until a pH of 3 is reached. Upon heating to 98° C. the granular material obtained is worked up in the manner described in Example 1.

EXAMPLE 10

55 Parts of semichloro-copperphthalocyanine (C. I. Pigment Blue 15:1; Colour Index 74160) in the form of an aqueous 30% filter cake are suspended in a 10% solution of 44 parts of resin in sodium hydroxide solution according to Example 1 and heated subsequently to 98° C. for 2 hours by injection of direct steam. The pigment suspension is cooled to 80° C. and diluted with water to a solids content of 3%. After addition of 1 part of the antioxidant as used in Example 1 a 31% hydrochloric acid is added rapidly until a pH of 4 is reached. The formation of the granular material is started by slow agitation and terminated by heating to 98° C.

The working up is carried out in the manner described in Example 1. There are obtained 99.5 parts of a granular material.

EXAMPLE 11

By coupling at a decreasing pH in the range of from 5.5 to 4.5 there is prepared at 20° C. a pigment suspension containing 50 parts of C. I. Pigment Yellow 83 (Colour Index 21108) in a final coupling volume of 1,900 parts. The pigment suspension is aftertreated for about 15 minutes at 85° C., adjusted to a pH of 10 by adding 33% sodium hydroxide solution and combined with a 30% solution of 50 parts of the resin specified in Example 1 in sodium hydroxide solution. The formation of granules is started by adding rapidly a 31% hydrochloric acid at a pH range of from 4 to 5 and is terminated by heating to 98° C. by injecting direct steam for 15 minutes. Upon working up in the manner described in Example 1 there are obtained 99.5 parts of a free-flowing granular material having a uniform structure.

EXAMPLE 12

By coupling at a pH range of from 5 to 7 and laking at a pH of 6.5 at 80° C. there is prepared a pigment suspension containing 55 parts of C. I. Pigment Red 53:1 (Colour Index 15585:1) in a final laking volume of 1,100 parts. After having adjusted the pH to 10 by addition of dilute sodium hydroxide solution there are added 45 parts of the resin as specified in Example 1 as a 25% solution in sodium hydroxide solution. Upon rapid addition of a 31% hydrochloric acid at 80° C. until a pH of 2 is reached, the mixture is heated to 98° C. and worked up in the manner described in Example 1 to yield 98 parts of a well-structured granular material which is dispersible in particularly easy manner in printing, offset printing and rotogravure printing inks.

EXAMPLE 13

When replacing half of the resin employed in Example 1 by an equal weight quantity of resin employed in Example 2 and when proceding in the manner described in Example 1, there are obtained well-shaped pigment granules.

What is claimed is:

1. A process for preparing pigment granules, which comprises adding to the aqueous suspension of a finely divided pigment an alkaline solution of from 25 to 90 weight %, based on the weight of the granules obtained, of colophony or a colophony derivative, acidifying the mixture, subjecting it to a flush process while stirring and heating to a temperature, above the softening point of the resin, up to 100° C. and isolating the granules obtained.

2. A process for preparing pigment granules as claimed in claim 1, which comprises adding to the aqueous suspension of a finely divided pigment an aqueous alkaline solution of colophony or a colophony derivative and, before or after adding the alkaline solution of the resin, heating up to a temperature up to 100° C., acidifying the resulting aqueous mixture at a temperature above the softening point of the colophony or colophony derivative, subjecting the resulting aqueous mixture to a flush process while stirring and heating to a temperature above the softening point of the colophony or colophony derivative, thereby forming pigment granules during the flush process, and isolating the granules thereby obtained at a temperature below the softening point of the colophony or colophony derivative.

3. A process as claimed in claim 1, wherein the colophony or colophony derivative content of the granules is from 35 to 70 weight %.

4. A process as claimed in claim 1, wherein the finely divided pigment suspension is that obtained in the pigment preparation.

5. A process as claimed in claim 1, wherein there is added from 0.1 to 2 weight % of an antioxidant.

6. A process as claimed in claim 1, wherein the colophony or colophony derivative is disproportionated or hydrogenated colophony.

7. A process as claimed in claim 1, wherein the pigment is an azo pigment, a laked azo pigment or a phthalocyanine pigment.

* * * * *